United States Patent Office 3,168,540
Patented Feb. 2, 1965

3,168,540
PROCESS FOR PREPARATION OF WATER-INSOLUBLE METAL SOAPS
Karl Culemeyer, Pinneberg, Germany, assignor to Th. Goldschmidt Aktiengesellschaft, Essen, Germany, a corporation of Germany
No Drawing. Filed Aug. 27, 1962, Ser. No. 219,724
Claims priority, application Germany Sept. 1, 1961
4 Claims. (Cl. 260—414)

It is known to the art to prepare metal soaps, i.e., the salts of metals with organic acids having three or more carbon atoms in a manner such that, in accordance with the so-called "double reaction," the water-insoluble metal soap is precipitated from an aqueous solution by the reaction of a water-soluble inorganic metal salt with the sodium or ammonium soap of the organic acid. In addition to the desired metal soap, the sodium or ammonium salt of the inorganic acid residue is formed. Although great quantities of metal soap are produced in accordance with this simple process, they possess, as the primary deficiency, an insufficient degree of purity. It is impossible to avoid the inclusion in the precipitate of larger or smaller quantities of the inorganic salts, for example, sodium or ammonium sulfate or ammonium chloride. It is not possible to effect complete removal of these inorganic salts even by repeated thorough washing.

The same result is obtained when, in accordance with another known process, a fatty acid dissolved in methyl or ethyl alcohol or acetone is added to a calcium chloride solution in admixture with excess ammonia. In this process also, no electrolyte-free end products are obtained.

In an attempt to obtain purer metal soaps, metal oxides or hydroxides are reacted directly with free fatty acids while melting the latter. However, more or less strongly oxidized, discolored products, having a relatively high free fatty acid content, have always been obtained. When working with an excess of metallic oxide or hydroxide, the end products still contain a portion of these substances mixed with free fatty acids.

In order to avoid these difficulties, metallic oxides or hydroxides and organic soap-forming acids have been reacted in the presence of small quantities of organic solvents by intimately milling or grinding the reactants in a ball mill, for example, whereupon the resulting products are diluted and purified with organic solvents. Instead of homogeneous soap-forming organic acids, two or more acids may be employed in order to satisfy the metal valences.

A process is also known to the art in which calcium hydrate solutions are agitated with an equivalent amount of a fatty acid for such time until complete reaction has occurred. This process has not been successful in practice because the quantities of liquid which must be handled are too large in view of the relatively small yield obtained, although, an electrolyte-free alkaline-earth metal salt of the fatty acid is obtained.

Similar electrolyte-free products are obtained by another known process in which an alkaline-earth hydrate in suspension is reacted with one or more free fatty acids having three or more carbon atoms in the molecule, particularly synthetic fatty acid mixtures obtained from paraffin oxidation. In this process, the fatty acids are utilized as solutions in a water-miscible organic or inorganic solvent, for example, aqueous ammonia and/or acetone, and a quantity of fatty acid equivalent to the alkaline earth is added to aqueous suspensions of the alkaline-earth hydrate. This known process has been modified in a manner such that a fatty acid emulsion in hot water is first prepared using an emulsifier. Simultaneously, a metallic oxide or hydroxide suspension in hot water is prepared and then the fatty acid emulsion is gradually added, with continuous agitation, to the suspension of metallic oxide or hydroxide.

This process, which yields an electrolyte-free metal soap, is, however, practicable only to a limited extent. In the preparation of the soaps, only those metal oxides which are relatively soluble in water with formation of the corresponding hydroxides can be used, whereas metal oxides which form water-insoluble hydroxide do not react with the free fatty acids even in dispersion.

In accordance with the present invention, it has unexpectedly been found that metals which form water-insoluble hydroxides may be used for direct reaction with free fatty acids in dispersion, when they are treated, dispersed in water, with carbon dioxide gas for a length of time such that, while vigorously agitating, the basic carbonates of the metals are formed. The passage of carbon dioxide through the dispersions, while vigorously agitating, for a period of from 1 to 4 hours is generally sufficient to complete the reaction. The metal carbonates, such as those of aluminum, lead and zinc, may be then reacted directly with emulsified fatty acids without difficulty. In order to obtain improved emulsification as well as to facilitate the initiation of the reaction, it is advisable to effect the emulsification of the fatty acids in known manner by the use of ammonia.

A further advantage of the process of the present invention resides in the fact that no other emulsifiers are required in addition to the small quantity of ammonia necessary to presaponify the emulsified fatty acid.

When the precipitation of the water-insoluble metal soaps is complete, they are filtered off and dried in the usual manner without further washing and any remaining residues of unreacted ammonia are separated with the water.

The metal soaps produced by the process of this invention are very fine-grained and are possessed of extraordinary purity, i.e., freedom from electrolytes. Due to the fact that inexpensive raw materials may be employed and the process step of preparing the alkali soap of the fatty acids is eliminated, the process is also very economical.

The invention will be further illustrated by references to the following examples:

Example 1

15.5 parts by weight of zinc oxide are dispersed in 1500 parts by weight of cold water while vigorously stirring. Then, a stream of carbon dioxide gas is passed through the dispersion for a period of 3 hours until a coarsely flocky precipitate is deposited rapidly and clearly. Then, 2 parts by weight of amomnia water (25% solution) are added.

100 parts by weight of stearic acid are mixed with 4 parts by weight of a 25% ammonia water solution and heated to 80° C. by steam injection. The resulting emulsion is very fine and homogeneous. The fatty acid emulsion, at a temperature of 80° C., is then flowed into the zinc salt suspension, being maintained at 20° C., slowly and uniformly over the course of 1 hour and stirring is continued for an additional hour whereupon the completely precipitated stearate gradually forms a dry layer on the surface of the precipitating bath due to phase separation. The zinc stearate is then drawn off by suction and dried at a temperature of about 90° C. The yield is 112 parts by weight of a very pure electrolyte-free zinc stearate.

Example 2

41.3 parts by weight of litharge (PbO) are dispersed in 3500 parts by weight of cold water while vigorously agitating. Then, a stream of carbon dioxide gas is passed through the dispersion for a period of 4 hours until a coarsely flocky precipitate is deposited rapidly and clearly. Then, 2.5 parts by weight of ammonia water (25% solution) are added.

100 parts by weight of tech. stearic acid (consisting of stearic acid and palmitic acid in a ratio of 1:1) are mixed with 4 parts by weight of a 25% ammonia water solution and heated to a temperature of 80° C. by steam injection. The resulting emulsion is very fine and homogeneous. Then, the fatty acid emulsion at a temperature of 80° C. is flowed into the cold suspension of basic lead carbonate slowly and uniformly in the course of 1.5 hours and stirring is continued for an additional hour whereupon the precipitated lead stearate gradually separates from the aqueous phase. The major portion of the water is decanted and the residual lead stearate is separated and dried at a temperature of 90° C. The yield is 137 parts by weight of very pure, electrolyte-free lead stearate.

It will be obvious to those skilled in the art that many modifications may be made within the scope of the present invention without departing from the spirit thereof, and the invention includes all such modifications.

What is claimed is:

1. A process for the preparation of a metal soap which comprises passing an ammonia water-emulsified, molten fatty acid into an aqueous suspension of a metal carbonate containing ammonia, the metal of which is selected from the group consisting of aluminum, lead, and zinc, and separating the metal soap from the reaction mixture.

2. A process according to claim 1 in which the metal carbonate suspension is vigorously agitated while the molten fatty acid is added.

3. A process according to claim 1 in which the fatty acid is stearic acid.

4. A process according to claim 1 in which the fatty acid is a mixture of stearic acid and palmitic acid.

References Cited in the file of this patent

UNITED STATES PATENTS

| | | |
|---|---|---|
| 1,878,962 | Meidert | Sept. 20, 1932 |
| 2,466,925 | Brauner | Apr. 12, 1949 |
| 2,650,932 | Kebrich et al. | Sept. 1, 1953 |
| 3,028,247 | Molnar | Apr. 3, 1962 |